United States Patent
Bolle et al.

(10) Patent No.: US 6,301,368 B1
(45) Date of Patent: Oct. 9, 2001

(54) SYSTEM AND METHOD FOR DATA HIDING IN COMPRESSED FINGERPRINT IMAGES

(75) Inventors: Rudolf Maarten Bolle, Bedford Hills; Jonathan Hudson Connell, Cortlandt-Manor; Nalini Kanta Ratha, White Plains, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,446

(22) Filed: Jan. 29, 1999

(51) Int. Cl.⁷ .................................................. G06K 9/00
(52) U.S. Cl. .............................................................. 382/100
(58) Field of Search ................................. 382/100, 232, 382/246, 251, 276, 282, 284; 713/176, 179; 705/64, 67; 455/411; 380/258; 348/568; 707/101

(56) References Cited

U.S. PATENT DOCUMENTS

| | | | |
|---|---|---|---|
| 5,339,108 | * | 8/1994 | Coleman et al. ..................... 348/408 |
| 5,727,092 | * | 3/1998 | Sandford, II et al. ................ 382/251 |
| 5,778,102 | * | 7/1998 | Sandford, II et al. ................ 382/251 |
| 5,905,819 | * | 5/1999 | Daly ..................................... 382/284 |
| 6,018,739 | * | 1/2000 | McCoy et al. ........................ 707/102 |
| 6,208,735 | * | 3/2001 | Cox et al. ............................... 380/54 |
| 6,208,745 | * | 3/2001 | Florencio et al. .................... 382/100 |

OTHER PUBLICATIONS

WSQ Gray–scale Fingerprint Image Compression Specification, IAFIS–IC–0110v2.

N. Ratha, et al, "Adaptive Flow Orientation–Based Feature Extraction in Fingerprint Images", Pattern Recognition, vol. 28, No. 11, pp. 1657, 1995.

W. Bender et al, "Techniques for data hiding", IBM Systems Journal, vol. 35, Nos. 3 and 4, 1996.

* cited by examiner

Primary Examiner—Andrew W. Johns
Assistant Examiner—Shervin Nakhjavan
(74) Attorney, Agent, or Firm—Louis J. Percello (57) ABSTRACT

A method to hide small messages in a wavelet compressed fingerprint image is presented. The method is characterized by random placement of the message bits in the compressed and quantized indices. The compressed image can be decompressed by any certified decompressor without any visible difference. However, the decoder aware of the decompression can only retrieve the hidden message in the image and additionally decompress the image without any error in pixel values.

18 Claims, 10 Drawing Sheets

SYSTEM AND METHOD FOR DATA HIDING IN COMPRESSED FINGERPRINT IMAGES

FIELD OF THE INVENTION

This invention relates to the field of image processing. More specifically, this invention relates to hiding information in compressed images, particularly for the use in wavelet-based compressed fingerprint images.

BACKGROUND OF THE INVENTION

Image understanding systems require an input image to process. The images are sensed either locally or remotely as the first step. In an unattended operation of the system (local or remote), it is possible to intercept the input image and reuse it for unknown purposes in the future. Alternatively, images can be constructed through other means or can be acquired from other sensors. In order to ensure that these kind of events do not take place, the system needs to authenticate the input image. If the input image can hide a message only known to the other stages of the system, then attacks outlined above will have no imapct as other stages can reject an input image not meeting the specifications. With the growth of the Internet over the last few years, many commercial applications are being explored. Such systems are often remotely operated and unattended. In such systems, if multimedia signals are involved for any purpose, the system must validate the signal before using it for any purpose. For example, an e-commerce system using a fingerprint of the subject to validate a transaction over the web such as airline ticket purchase needs to ensure that the fingerprint image being transmitted from the remote client is not an earlier acquired image or otherwise constructed image. By hiding a new message string in the image every time the image is acquired, the system can make sure that the image is not a stale old copy. If the message is hidden in known places in the image, it is easy to modify the image to the desired message. Often because of their large size, the images are compressed using either domain specific or general compression techniques to save bandwidth. The problems illustrated earlier apply to these compressed images as long as the compression standard is known.

Figure 1:
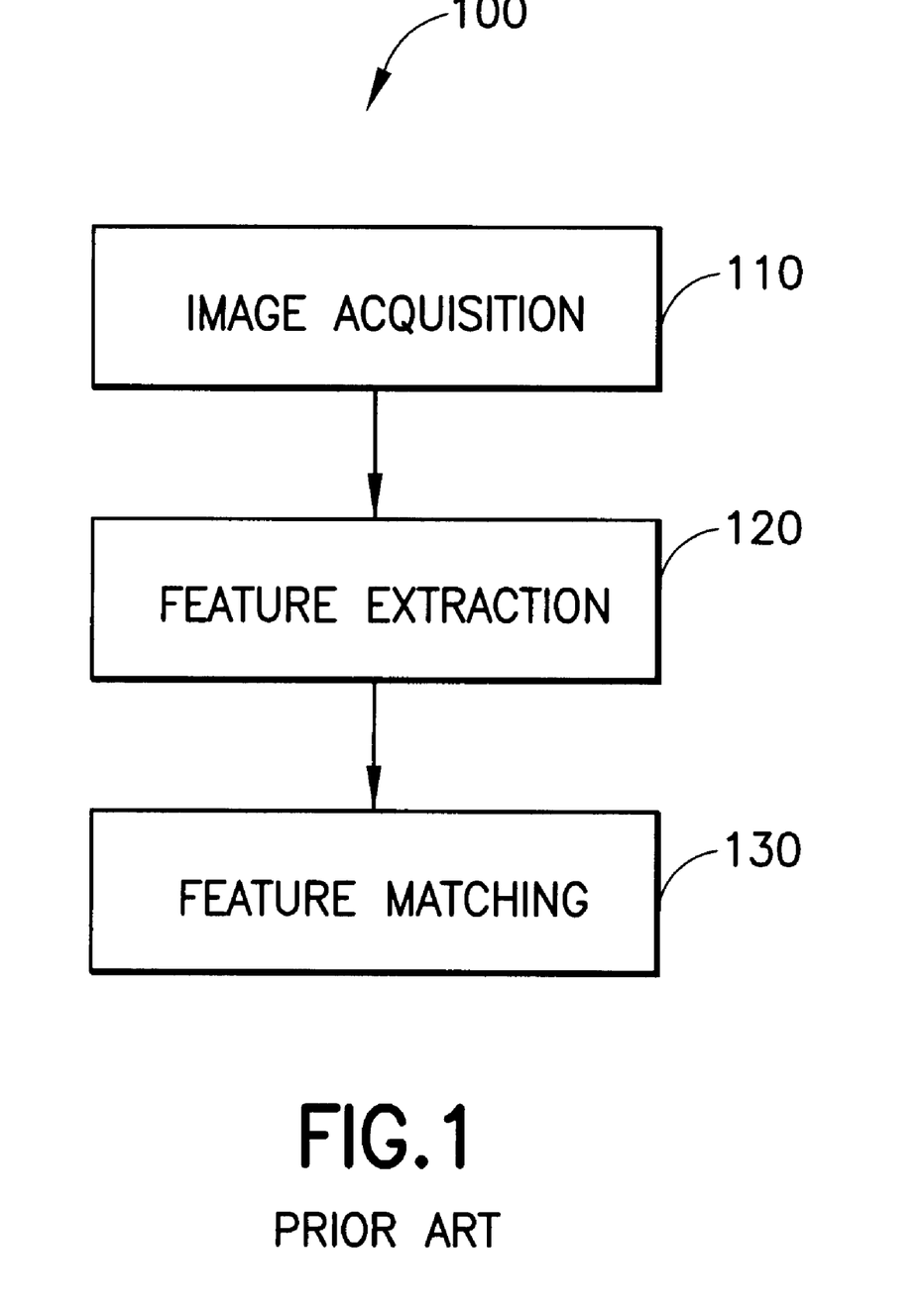
FIG. 1 is a block diagram of a prior art automatic fingerprint identification system.

Fingerprints have been used for authentication and identification purposes for several decades. A typical automatic fingerprint identification systems consists of an image acquisition stage (110) followed by two other stages as shown in FIG. 1. Fingerprint matching comprises two steps: feature extraction (120) and feature matching (130). The following reference describes examples of the state of the prior art:

N. K. Ratha, S. Chen and A. K. Jain, Adaptive flow orientation based feature extraction in fingerprint images, Pattern Recognition, vol. 28, no. 11, pp. 1657–1672, November 1995.

This reference is incorporated herein by reference in its entirety.

In step 110, the image is acquired. This acquisition can be either local or remote. There are several techniques available for sensing the image. These include optical, capacitance, thermal and ultrasound. Depending on the application, either the sensed image can be locally acquired or remotely acquired. For example, in a home-based banking system allowing remote access to a user's bank account based on fingerprint-based authentication will require the fingerprint to be sensed on the user's fingerprint scanner located in his home. Other examples of remote fingerprint acquisition include point of sale transaction authorization based on fingerprints. In such situations, verification can be done locally or the image can be compressed and transmitted to a server over a network.

Image compression techniques in general try to eliminate redundant information in the image description thereby achieving a compact representation of the signal. Lossless compression schemes usually offer low compression ratios while retaining the ability to fully reconstruct the image whereas lossy compression techniques offer very high compression ratios with degradation of the visual image quality. There are a number of standard as well as domain specific techniques available to compress images. Standard compression techniques include JPEG and GIF. Many other domain specific compression algorithms have been proposed in the literature to compress grayscale fingerprint images because the standard techniques have a tendency to blur the high frequency structural ridge features in fingerprint images. Thus, the decompressed image has lost the necessary detail which is needed for further processing. Wavelets offer a compact representation scheme for signal representations. Many wavelet-based signal and image processing techniques have been described in the literature. Recently, the FBI has proposed a fingerprint image compression and decompression standard known as the Wavelet Scalar Quantization (WSQ). The following reference describes the standard.

WSQ Gary-scale fingerprint image compression specification IAFIS-IC-011v2 (rev 2.0), February 1993. Drafted by T. Hopper, C. Brislawn, and J. Bradley, Federal Bureau of Investigation This reference is incorporated herein by reference in its entirety.

Data hiding is a form of steganography to embed data (messages) into digital media for the purpose of identification, annotation and copyright. Data hiding techniques ensure that embedded data remain inviolate and recoverable while not restricting the access to the media. The size of the message that can be efficiently hidden is limited by many factors including the image size. One of the main application of data hiding techniques is to embed annotations about the media such as features of an image including description and name or any other information the user feels important for future. Yet another application of data hiding is the placement of a digital watermark. Various techniques for data hiding are surveyed in the following reference.

W. Bender, D. Gruhl, N. Morimoto and A. Lu, Techniques for data hiding, IBM Systems Journal, Vol. 35, No. 3 &4, 1996.

This reference is incorporated herein by reference in its entirety.

PROBLEMS WITH THE PRIOR ART

Data hiding in a compressed signal poses several challenges. First, the possible places to hide the message have been shrunk significantly by the compression process. Secondly, any alteration of the compressed coefficients or indices will result in significant changes in a group of pixels depending on the compression scheme used. For biometrics images, there are extra challenges. If the modifications made in the compressed coefficients cause changes in the structural properties of the image or any other feature being used by subsequent processes, the distortions after decompression are not tolerable. If possible, the perfect reconstruction should be supported. Yet another problem with prior art is that one can use predictable sites to hide the message. This has the problem that once it is known by hackers, the hidden message can be easily recovered.

Sandford et al. (U.S. Pat. No. 5,727,092) describe a system wherein a message is embedded in the coefficients of a WSQ compressed image. However, first Sanford requires that the decoder be supplied a separate key in order to extract the hidden message (page 5 lines 22–25, page 8 lines 11–41). Transmitting this key in a secure way then becomes a concern. Second, in Sandford, sites are chosen more or less without particular regard to the effect their modification has on the compressed image. Their process starts by aggregating the coefficients from all scales into a single histogram (page 4 lines 33–40) which is then used for site selection. The only limitation is that the values must differ by only a small amount (typically one). Third, Sandford scans the coefficient file sequentially from the beginning until he finds a value that matches one of his candidate pairs. He then modifies this site and continues scanning from where he left off (page 7 lines 29–37). This means that, at least for short messages, the altered sites are all near the beginning of the coefficient file and the embedded bits are in the same order as in the message itself.

The following references give further background and are incorporated by reference in their entirety:

M. T. Sanford II, T. G. Handel and J. N. Bradley, Compression embedding U.S. Pat. No. 5,727,092 March 1998.

M. T. Sanford II, T. G. Handel and J. N. Bradley, Compression embedding U.S. Pat. No. 5,778,102 July, 1998

M. T. Sanford II and T. G. Handel, Data embedding employing degenerate clusters of data having differences less than noise value U.S. Pat. No. 5,819,289 October, 1998.

OBJECT OF THE INVENTION

An object of this invention is an improved system and method for hiding information in a compressed image.

An object of this invention is an improved system and method for hiding information in a compressed fingerprint image.

An object of this invention is an improved system and method for hiding information in a compressed image with no or minimum distortion on the image.

An object of this invention is an improved system and method for hiding information in a compressed image in varying locations in the image.

SUMMARY OF THE INVENTION

The invention is a system and method that hides a given message in a compressed image at random sites. Many variations of the same basic approach can be designed to make each installation unique for security purposes. While the invention is specifically concerned with fingerprints as the image, it also applies to other images and other compression techniques.

In the present preferred embodiment, the quantized wavelet coefficients of the input image are chosen as the representation where the message is hidden. A pseudo-random generator is seeded based on a particular image subband characteristic. The least significant bit of randomly selected quantized wavelet coefficients of the image that meet additional constraints are set to the message bits. The original bits at the sites are stored as a comment appendix which allows perfect reconstruction without the hidden message. The modified bit stream, when decompressed using standard decompression software produces insignificant visual changes and thus can get passed through as the true decoded image. However, only the decoder aware of the process can totally restore the message and also fully reconstruct the image.

DETAILED DESCRIPTION OF THE INVENTION

In many applications such as e-commerce remote authentication of a person using a biometric signal of the user will become a requirement. For this purpose, the images acquired remotely, would require an authentication message such as date, time or other descriptions of the transaction to be hidden in the image so that the server can check the validity of the image it receives. In addition, there are other applications that will require an authentication message to be hidden in an image at the time of capture. We describe a preferred embodiment of this invention using compressed fingerprint images being sent to a system after hiding a message in it.

This invention deals with a secure data hiding method specifically for fingerprint images compressed using wavelets. An example such compression is Wavelet Scalar Quantization (WSQ) compression scheme. Instead of just sending a compressed bit stream from a client to the server, the addition of special messages as desired by the server increases the security of the overall system. By being able to randomly place the message bits, the data hiding algorithm makes the system difficult to be broken into. The message is hidden while creating minimal visual distortion so that the changes will not be noticed by a standard decoder. Only the decoder aware of the application can retrieve the exact stored message from the compressed bit stream while optionally restoring the decompressed image to its original form.

Our approach offers many improvements over the prior art. No separate key is required as long as the encoder and decoder agree on the random number generator used. And, while an optional appendix can be included to enhance image quality, this is not necessary for message extraction. A further improvement over the prior art concerns the reconstruction quality. In our system there is a further restriction that the percentage variation in a value must be small. Also, we selectively choose values only from the higher frequency components thus limiting the spatial extent of any distortions introduced. Additionally, our invention makes it much harder to determine which sites have been modified to contain the message. In contrast to the prior art, for each message bit our method pseudo-randomly selects some site in the candidate set for modification. Thus the allowed sites are not necessarily used consecutively, nor are the modified sites in the same order as their respective message bits. This makes our scheme much harder to crack even in the event that a hacker gains possession of either the unmodified image or the true message text.

Compressed images are described in terms of a number of coefficients or sites. Using a subset of these sites to hide messages, there are three components in the system involving the data hiding algorithm. The first component handles selection of sites that will not impact the image significantly even if someone decompresses the image without removing the hidden message. Second component involves selection of a property or function of the non-selected sites that can be used to seed a pseudo random number generator. Finally, using the random generator and the candidate sites, pick random locations in the quantized image coefficients space. These are termed the site set. Once a site set is decided, the least significant portion of the sites (coefficients) is changed to the message bit required to be stored. The original value of this portion can be stored to an appendix. We assume the minor perturbations in the indices will not change the Huffman coding characteristics significantly. The appendix bits generated can be stored optionally as a comment in the final compressed bit stream file for full recovery of the signal. The bits in the appendix are generally uncorrellated with the message bits and hence do not reveal any secret information.

Message recovery process works as follows. The initial phase of constructing the quantizer tables used in the system is unchanged. The site set is generated again based on the agreed constraints. The pseudo-random number generator seed is recomputed as a function of the non-selected sites using the predecided characteristics. Now the site addresses that were actually modified are regenerated in order using the random generator. The least significant bit is read at these locations to construct the message. If a proper appendix is stored in the compressed bit stream, the quantized indices can optionally be restored to their true values. The site selection procedure ensures that there will be minimal change in the reconstructed image even when the least significant bit is not restored.

Let us describe the current invention in detail. FIG. 1 depicts the well-know method of automated fingerprint authentication. The process starts with fingerprint image acquisition 110, followed by extraction of the fingerprint image features 120. The resulting features (also known as minutiae) are then matched 130 with stored templates to verify the identity of the subject. In remote or networked applications the image acquisition 110 resides on a client 250

Figure 2:
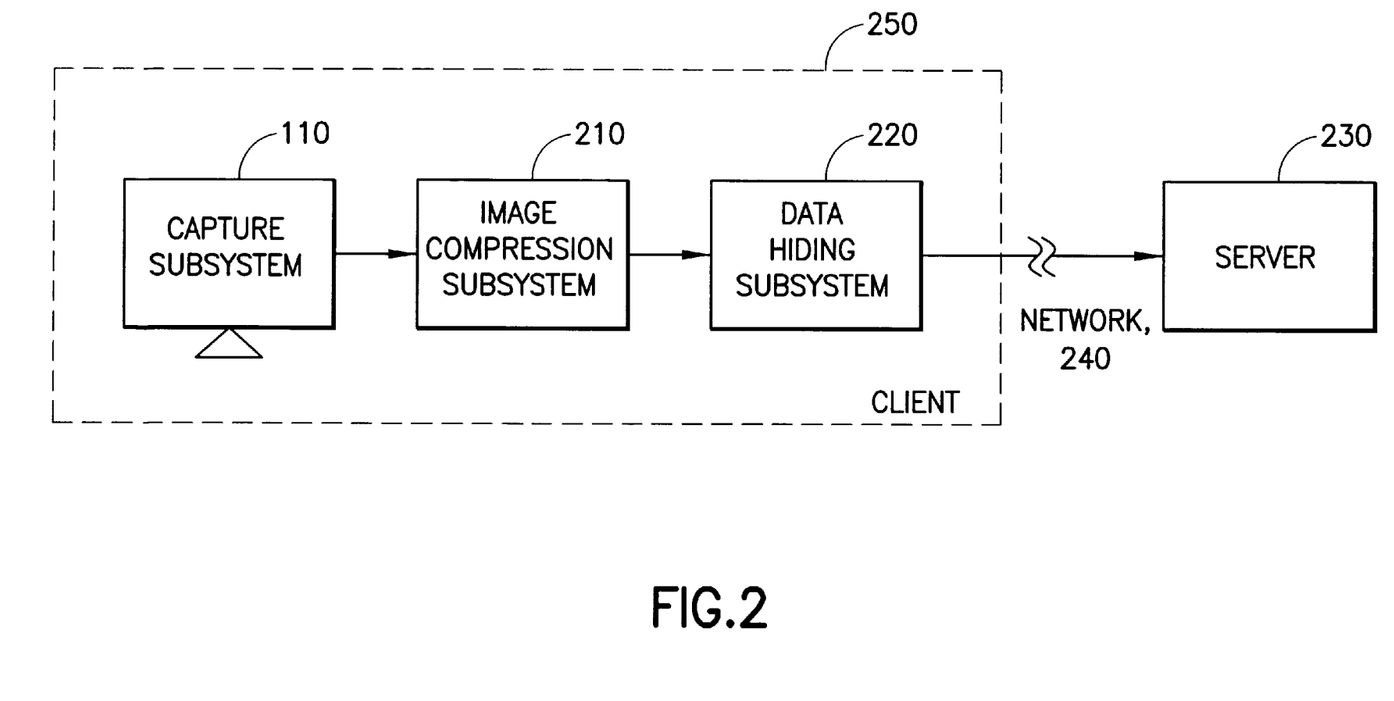
FIG. 2 is a block diagram of one preferred embodiment of the present invention.

FIG. 2 is a block diagram showing an overall view of the invention. Feature extraction and matching is achieved on a server 230 which is connected to the client 250 by the network 240. The client also contains a compression subsystem 210 which reduces the total size of the image and the data hiding subsystem 220, which hides a message or information sequence in the compressed image.

Figure 3:
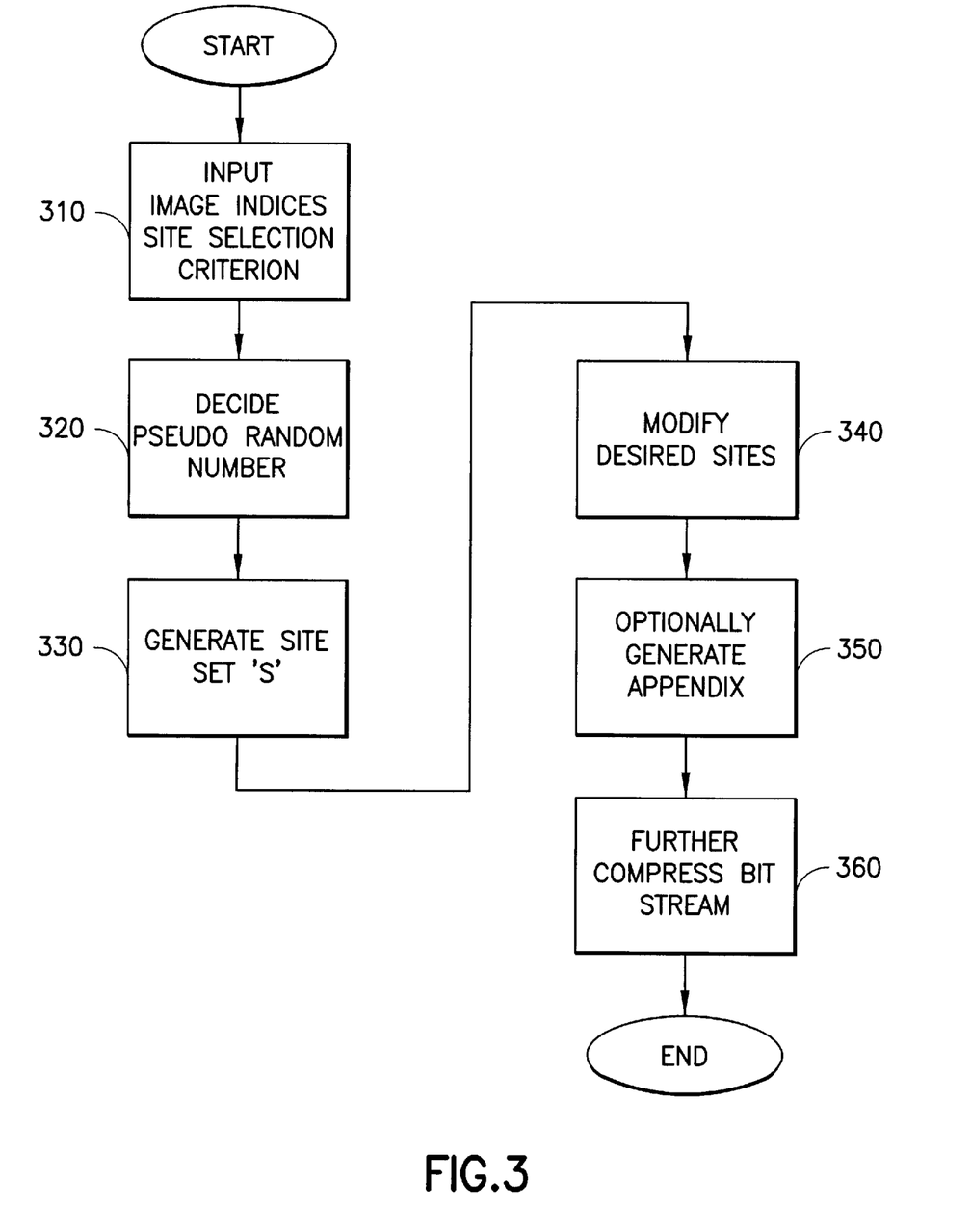
FIG. 3 is a block diagram of the data hiding algorithm.

FIG. 3 gives the algorithmic steps in the data hiding subsystem 230 which uses properties of the Wavelet Scalar Quantization (WSQ) compression scheme. This compression scheme creates a spatially compressed image with a plurality of frequency components, each with a respective spatial frequency and a respective amplitude. In the first step 310, candidate sites (frequency components) are selected which have high spatial frequencies and large amplitudes. Here a frequency is high if it is large compared to the frequency of the lowest subband and an amplitude is large when the contribution of the least significant bit is small compared to the magnitude. In step 320 a pseudo random number is used to generate 330 a site set S. It is this site set S which is modified by the message that is to be hidden in the compressed image 340. This is achieved in such a fashion that the frequency components are only very slightly changed and, hence, the decompressed image is only slightly changed. However, it is optionally possible to generate an appendix to the frequency coefficients (350) which allows for undistorted (not affected by the hidden message) decompression of the image. Finally, the frequency components are losslessly compressed to generate a compressed bit stream 360 using the remaining steps of the standard Wavelet Scalar Quantization (WSQ) compression.

Figure 4A:
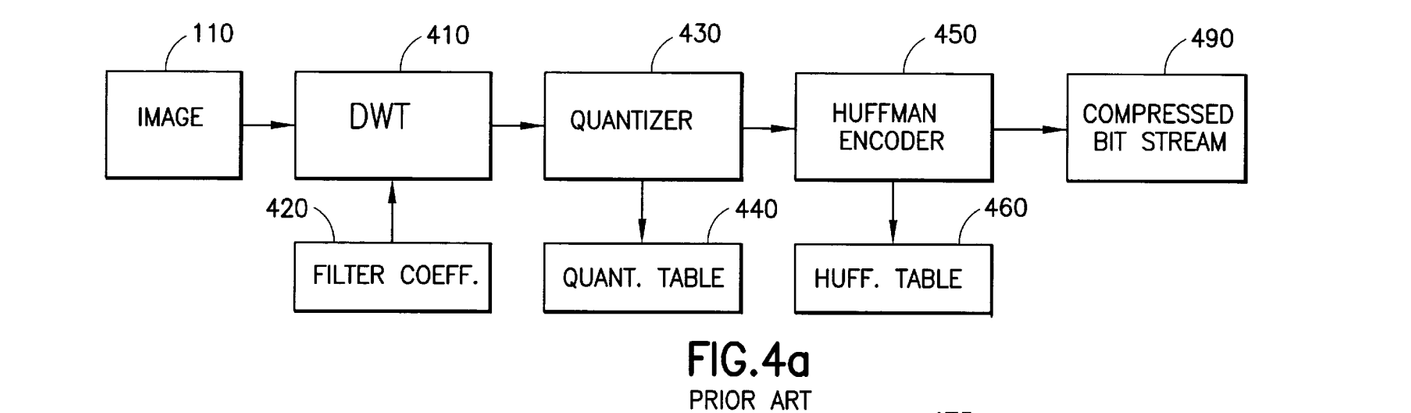
FIG. 4a is a block diagram of a prior art image compressor.
Figure 4B:
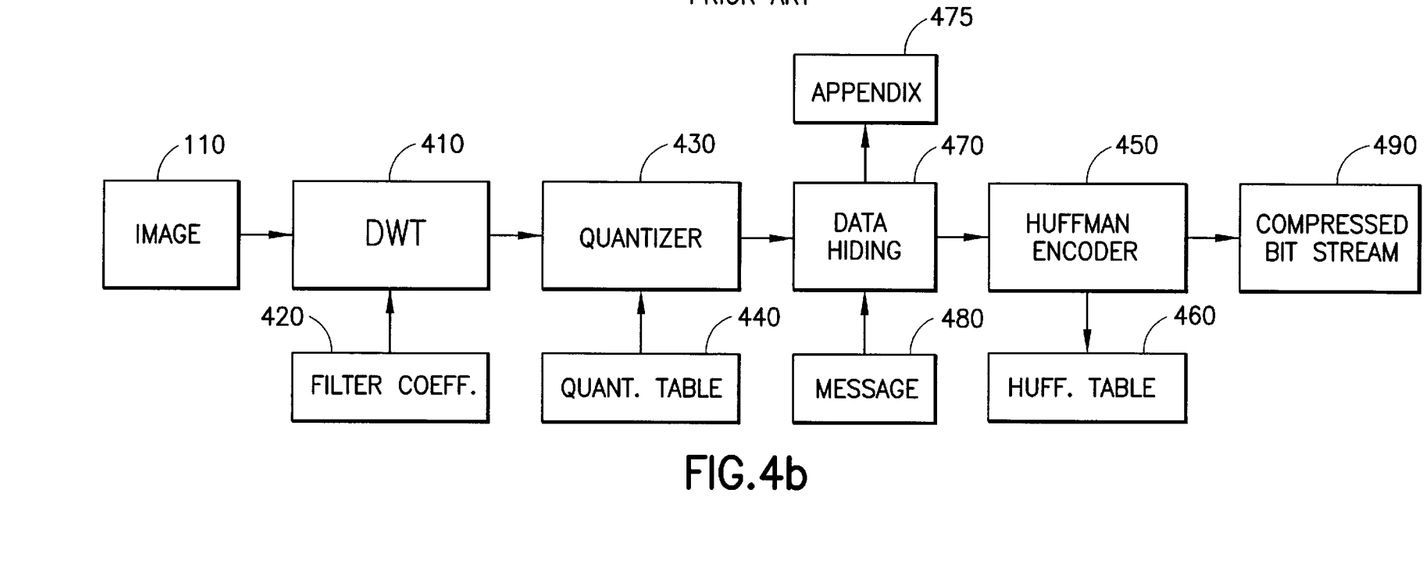
FIG. 4b is a block diagram of a preferred embodiment of the present novel image compressor.

FIG. 4a shows the WSQ compression scheme (prior art) and compares it with a WSQ scheme that embeds messages or information sequences in the compressed image (FIG. 4b). The prior art WSQ takes an image 110 as input and through the Discrete Wavelet Transform (DWT) 410, combined with filter coefficients 420, determines the frequency components. With the help of the quantization table 440, these components are quantized in 430. Finally using a Huffinan table 460, a Huffman encoder 450 compresses the quantized frequency components. This results in a compressed bit stream 490. The block diagram with WSQ compression and data hiding of a message 480, FIG. 4b, is only slightly modified with an extra step. Here after the Huffman encoding 450 of the frequency components, the message 480 is hidden in the least significant bits of the Huffman encoded frequency components through a process called data hiding 470. This data hiding is described in FIG. 3 through the steps 310–360. The data hiding process also generates an optional restoration appendix 475.

Figure 5:
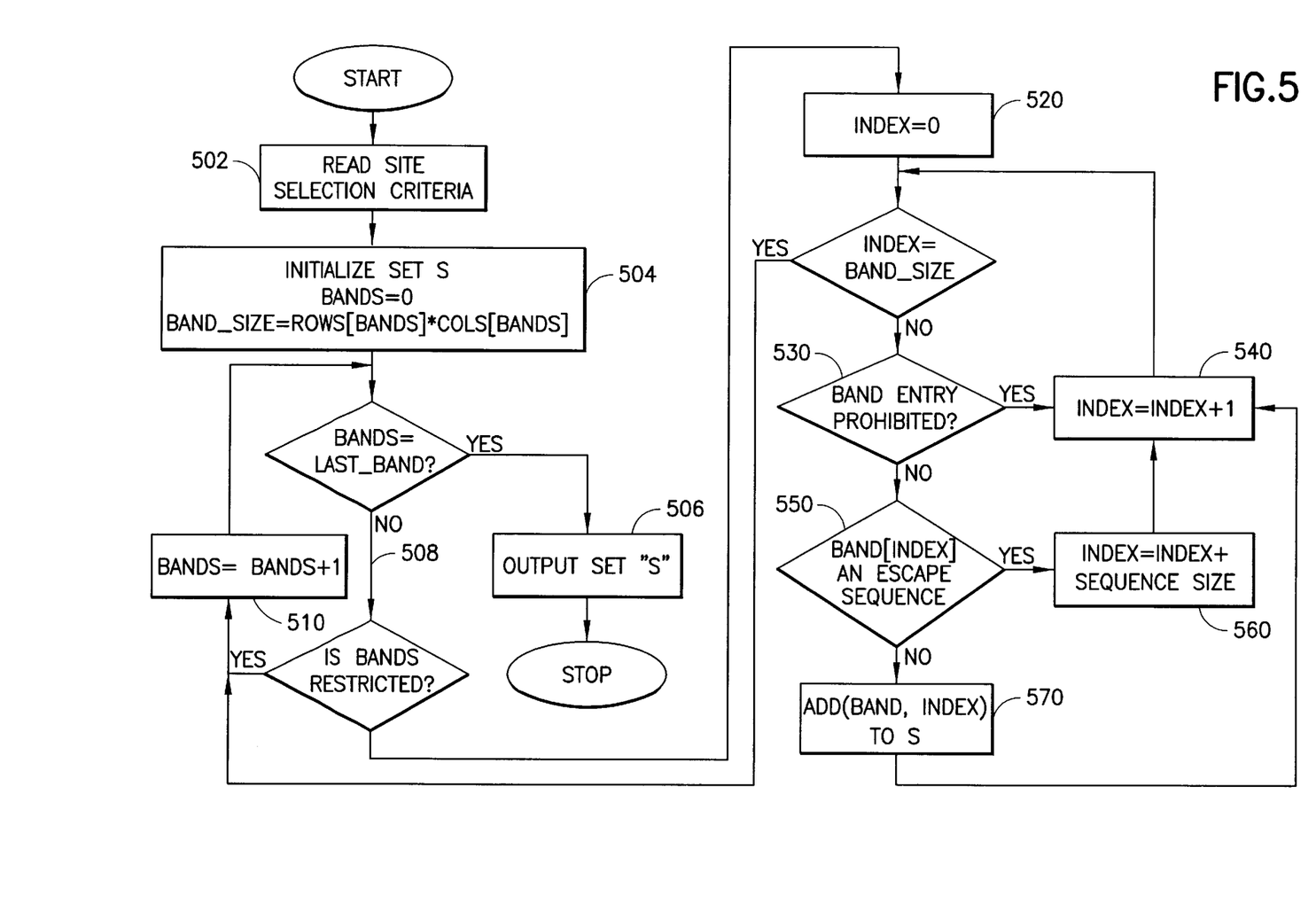
FIG. 5 is a flow chart of a candidate site selector.

The flowchart for selecting the candidates for the sites is shown in FIG. 5. In step 502, the criteria for selecting the sites are read. This includes the subbands (frequency components) that are prohibited because changes in them would significantly impact image quality, the amplitude codes designating escape sequences with special meanings, and the amplitude ranges that are prohibited because their change might lead to a significant degradation or damage to the decompression. The size of each subband (frequency coefficient) can be calculated from the original image dimensions as per the compression algorithm being used. For WSQ algorithm it is specified in the specifications document referenced earlier. In step 504, the set S to contain the list of candidate sites is initialized and the size of the band is computed. For each subband that is not prohibited, the steps starting from 520 are repeated. When all the subbands have been examined, the set S is output as shown in step 506 and S is passed to the site selector flowchart shown in FIG. 6. If a prohibited band is reached, then the subband counter is incremented. For all the indices possible in a selected subband if the amplitude is a prohibited entry, then the index is incremented (step 540). If the amplitude really codes the start of an escape sequence, step 550, the index is incremented by the size of the sequence as shown in step 560. Otherwise in step 570 the subband and the index is inserted into the set S. On completing a band, the algorithm returns to step 510.

Figure 6:
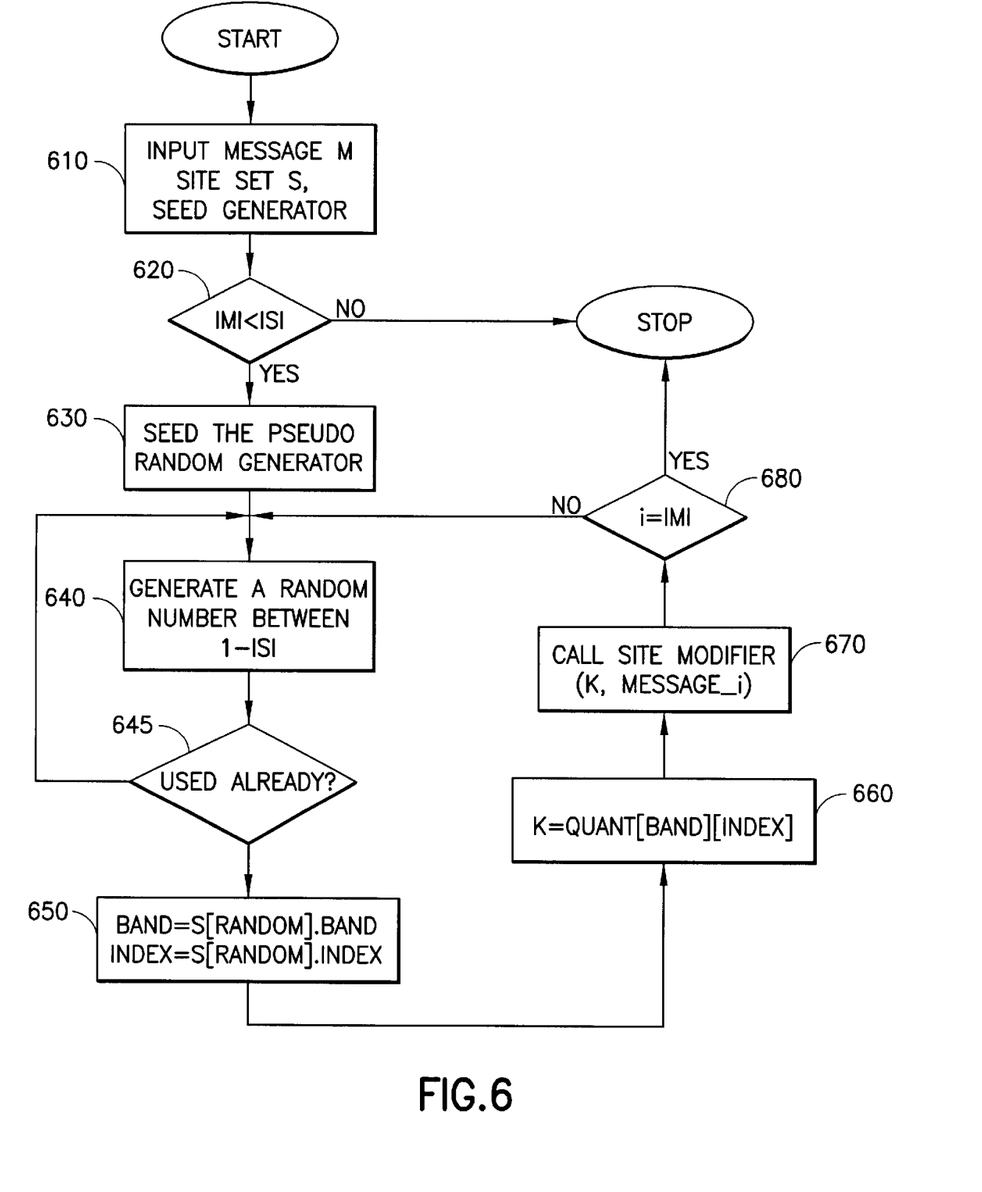
FIG. 6 is a flow chart of a site set selector.

The site selector algorithm flowchart is shown in FIG. 6. In step 610, the inputs to the algorithm are the information sequence or message M, the site set S computed using algorithm in FIG. 5 and a seed for the pseudo-random number generator. Each entry in S consists of a tuple (band, index), where band is the subband number and the index is the pointer within the subband. If the message size |M| is more than cardinality of set S, |S|, the algorithm cannot proceed and stops (step 620). Otherwise, in step 630, the pseudo-random generator is seeded using the seed received as the input 610. A random number between 1 and cardinality of S is generated in step 640. If this random number has already been generated for this image, step 645, a new random number is generated. Otherwise, the band and index in the selected band is obtained from the set S in step 650. The amplitude at the subband and index obtained in 650 is looked up in 660 and passed to site modifier described in FIG. 7 along with the message portion in step 670. If the full message has not been completed, the process is repeated from step 640, else the process stops in step 680.

Figure 7:
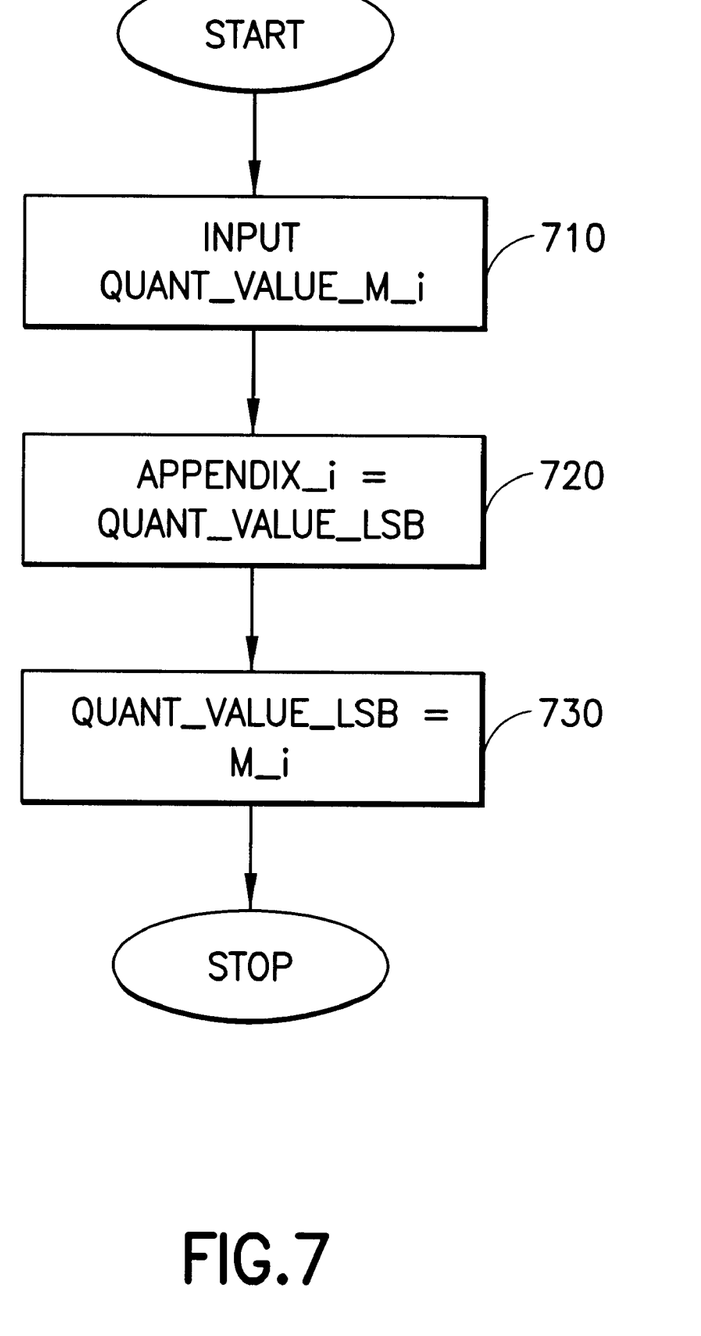
FIG. 7 is a flow chart of a site modifier.

The site modifier flow chart is shown in FIG. 7. The inputs to this algorithm are the message portion and the quantized amplitude coefficient value as in step 710. The least significant portion of the amplitude value is appended to the appendix in step 720. The least significant portion of amplitude is replaced with the message portion in step 730. In other embodiments where functions of the message portion are being used (e.g., square of portion), the output of the function replaces the least significant portion of the amplitude.

Figure 8A:
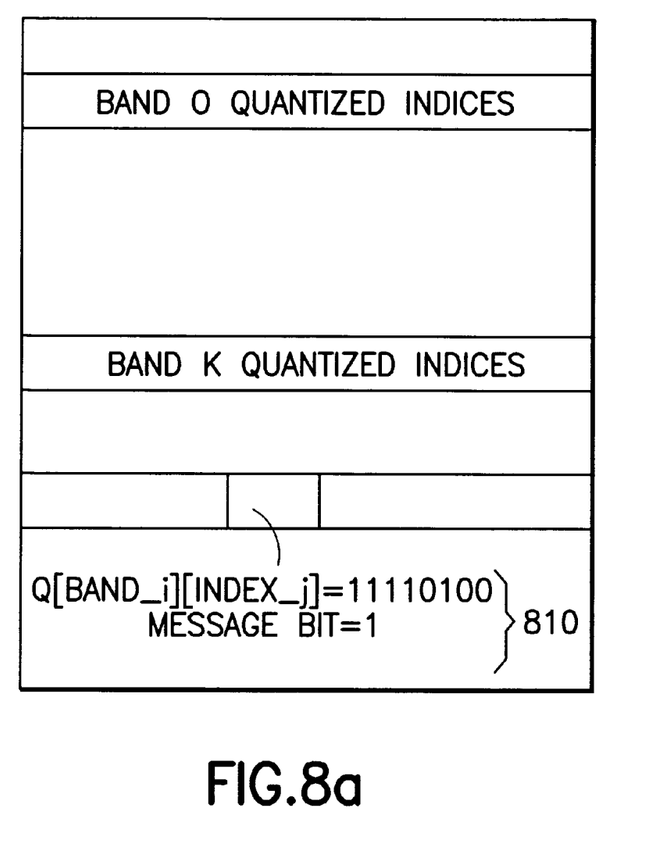
FIG. 8 is a block diagram of the image representation before modification (FIG. 8a) and after modification (FIG. 8b) showing an option data appendage.
Figure 8B:
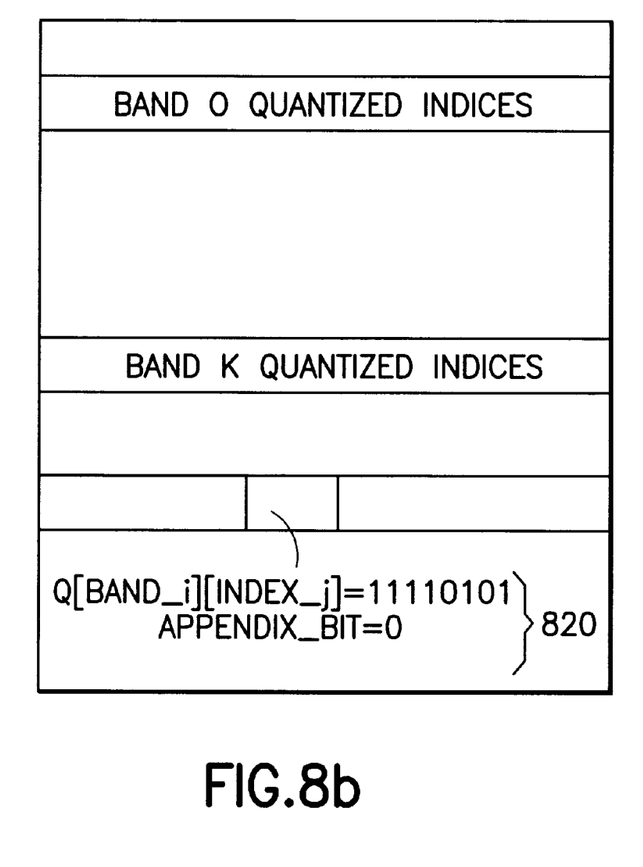

In FIG. 8, the changes in an imaginary amplitude value is being shown. In FIG. 8a, the compressed sequence before change is shown. If the amplitude value as shown at the selected site is (11110100) or "F4" represented using hexadecimal numbers, and the message portion is a bit "1" (step 810), after the changes described above, the amplitude becomes (11110101) "F5" hexadecimal and the appendix is appended with a bit "0" (step 820). The changed index is shown in FIG. 8b. That is, the least significant bit of the amplitude value is replaced by the message bit, while the original least significant bit of the amplitude is placed in the appendix.

Figure 9A:
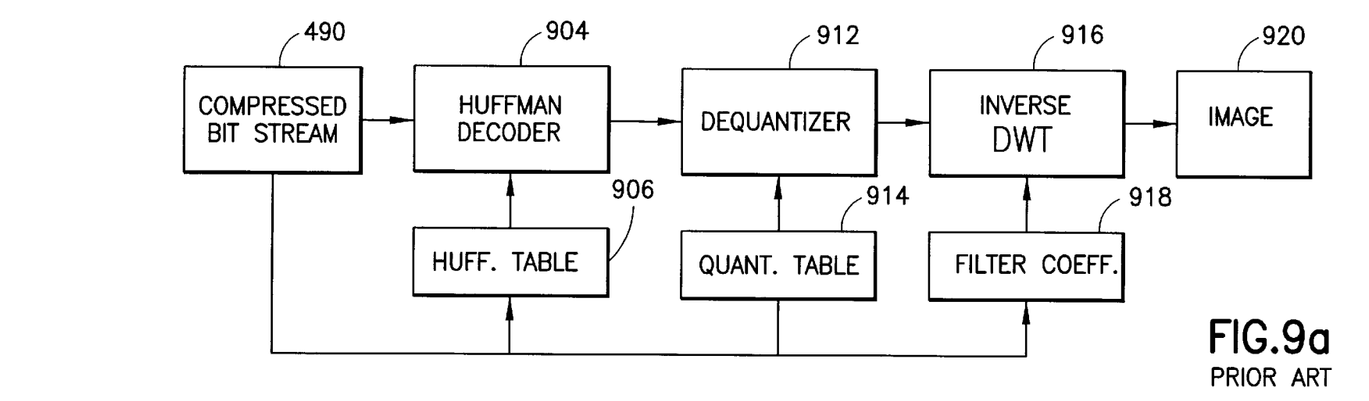
FIG. 9a is a block diagram of a prior art decompressor.
Figure 9B:
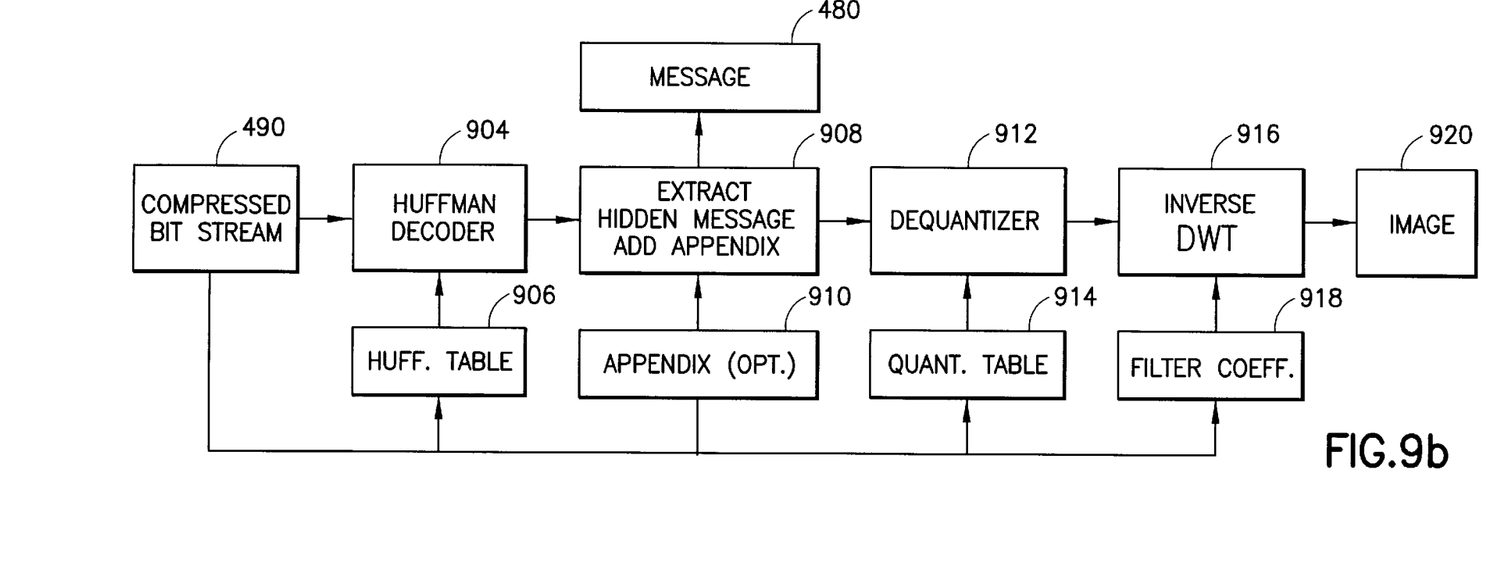
FIG. 9b is a block diagram of a preferred novel decompressor.

The block diagram for extracting the hidden message during the decompression process is shown in FIG. 9. The standard decompression process is shown in FIG. 9a (prior art). The novel decompressor that can extract the message is shown in FIG. 9b. The compressed bit stream with the hidden message is partially decoded to first extract the tables (906, 914, 918) and the appendix (910) if present. From the frequency subband amplitudes, the hidden message is extracted (908). The dequantizer (912) works on the frequency subband amplitudes and feeds the results to the inverse discrete wavelet transform (910). The reconstructed image (920) is the response of the inverse wavelet transform. The message extraction algorithm uses the same candidate site selection algorithm (FIG. 5) and the site selection (FIG. 6) algorithm. Only the site modification algorithm is different as shown in FIG. 10.

Figure 10:
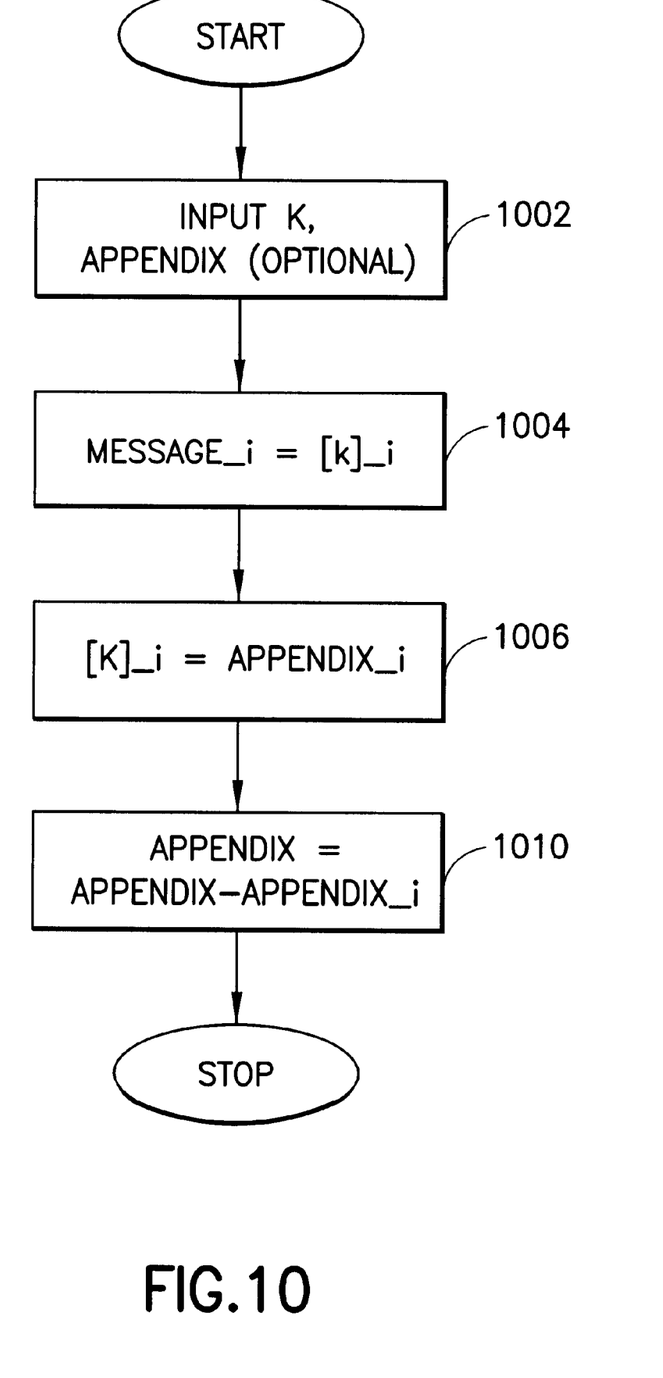
FIG. 10 is a flow chart of a site modifier during decompression.

The flowchart to reconstruct sites during decompression is shown in FIG. 10. The input to this stage are the amplitude and the appendix as shown in step 1002. The message is appended with the least significant portion of the amplitude, 1004. If the appendix is available, the least significant portion of the amplitude is replaced with the current portion of the appendix shown in 1006. The appendix is updated in step 1010.

We claim:

1. A computer system for hiding an information sequence in a compressed image comprising:

an image compressor that spatially compresses an image to create a spatially compressed image with a plurality of frequency components, each with a respective spatial frequency and a respective amplitude;

a candidate selector that selects a selected set of a plurality of the frequency components, the selected set having the frequency components with high spatial frequencies and large amplitudes;

a data site selector that uses a random process to randomly select from the selected set to create a site set; and a site modifier that partitions the information sequence into one or more portions and uses one or more of the portions to modify one of the amplitudes of one of the frequency components in the site set.

2. A computer system, as in claim 1, where the image compressor is any one or more of the following: a wavelet scalar quantization (WSQ), a joint picture expert group (JPEG), a motion picture expert group (MPEG), JBIG, or other frequency decomposition compression scheme.

3. A computer system, as in claim 1, where the image is any one or more of the following: a fingerprint image, a face image, a biometric signature, or other biometrics signals.

4. A computer system, as in claim 1, where the frequency component has a high spatial frequency when the frequency is large compared to the smallest frequency subband used in the compression algorithm.

5. A computer system, as in claim 1, where the frequency component has a high spatial frequency when the frequency is at least two times higher than the lowest frequency subband used in the compression algorithm.

6. A computer system, as in claim 1, where the frequency component has a large amplitude when the contribution of the least significant portion is small compared to the magnitude of the amplitude of the frequency component.

7. A computer system, as in claim 1, where the frequency component has a large amplitude when the contribution of the least significant portion is five times smaller than the magnitude of the amplitude of the frequency component.

8. A computer system, as in claim 1, where the random process includes any one or more of the following: a pseudo-random number generator, an algorithm to select the seed for the pseudo-random generator, a modulus.

9. A computer system, as in claim 8, where a portion of the pseudo-random number generator seed is computed from the frequency components of the spatially compressed image.

10. A computer system, as in claim 1, where the information sequence includes any one or more of the following: a text stream, a user identification number, a date, a time, a social security number, a serial number, global positioning system reported coordinates.

11. A computer system, as in claim 1, where the portions include any one or more of the following: bits, nibbles, bytes, characters, fixed size subdivisions or variable sized subdivision of the information sequence.

12. A computer system, as in claim 1, where the site modifier uses any one or more of the following to modify the amplitude: a logical function of the portion, a random function of the portion, a strictly monotonic function of the portion.

13. A computer system, as in claim 1, where the site modifier stores portions of the amplitudes before they are modified in a data appendage that is appended to the compressed image.

14. A computer system, as in claim 1, where the site modifier stores restoration information about how to restore the modified amplitudes in a data appendage that is appended to the compressed image.

15. A computer system for extracting a hidden information sequence from a compressed image comprising:

an image decompressor that partially decompresses the image to create a plurality of frequency components, each with a respective spatial frequency and a respective amplitude;

a candidate selector that selects a selected set of a plurality of the frequency components, the selected set having the frequency components with high spatial frequencies and large amplitudes;

a data site selector that uses a random process to randomly select from the selected set to create a site set; and a message extractor that uses one of the amplitudes of one of the frequency components in the site set to extract one or more portions of the information sequence.

16. A computer system, as in claim 15, where the message extractor uses any one or more of the following: a logical function of the amplitude, a random function of the amplitude, a strictly monotonic function of the amplitude.

17. A computer system, as in claim 15, where the message extractor restores the portions of the amplitudes from a data appendage that is appended to the compressed image.

18. A computer system, as in claim 15, where the message extractor restores the amplitudes using restoration information from a data appendage that is appended to the compressed image.

* * * * *